United States Patent [19]
Naylor et al.

[11] 3,753,343
[45] Aug. 21, 1973

[54] APPARATUS FOR FALSE-TWISTING YARN

[75] Inventors: Geoffrey Naylor; Harold Sydney Warne, Macclesfield, England

[73] Assignee: Ernest Scragg & Sons Limited, Macclesfield, Cheshire, England

[22] Filed: Jan. 19, 1972

[21] Appl. No.: 219,026

[52] U.S. Cl. ............................................. 57/77.45
[51] Int. Cl. ........................... D02g 1/04, D02g 1/06
[58] Field of Search ................. 57/77.3, 77.4, 77.45

[56] References Cited
UNITED STATES PATENTS
3,656,290  4/1972  Kuussaari ...................... 57/77.45 X
2,928,229  4/1960  Haas ............................. 57/77.45 X FOREIGN PATENTS OR APPLICATIONS
951,223  3/1964  Great Britain .................... 57/77.45
848,971  9/1960  Great Britain .................... 57/77.45
932,206  7/1963  Great Britain .................... 57/77.45
1,023,951  3/1966  Great Britain .................... 57/77.45

Primary Examiner—Donald E. Watkins
Attorney—Michael S. Striker

[57] ABSTRACT

A bush twister for false-twisting yarn is of the known kind comprising a friction bush at each end of a bush tube of comparitively large diameter, the yarn being false-twisted by running it through the bore of the bush twister, which is not supported in anti-friction bearings but is supported and driven by engagement with the rim of a driving wheel, against which the bush twister is held by a pair of idler wheels on a pivotal spring-loaded arm.

17 Claims, 4 Drawing Figures

PATENTED AUG 21 1973

APPARATUS FOR FALSE-TWISTING YARN

This invention relates to apparatus for false-twisting yarn, and of the kind in which a running yarn is false-twisted by a so-called bush twister comprising a friction bush or bushes carried by a bush tube of comparatively large diameter, through the bore of which the running yarn passes to be false-twisted by engagement with the friction bush or bushes rotating in a direction transverse to the path of the running yarn.

Hitherto it has been customary to support the bush twister of this kind in ball bearings or similar anti-friction bearings, but at the high speeds of rotation required of bush twisters of this kind, bearing failure and lubrication of the bearings becomes a major problem.

According to the present invention, in apparatus of the kind referred to above, the bush twister is not mounted in anti-friction bearings but is supported and driven by engagement with the periphery of a rotatable driving wheel, means being provided for holding the bush twister in frictional driving engagement with the periphery of the driving wheel.

The holding means may comprise a pair of wheel members, freely rotatable about parallel axes, and each wheel member may comprise two discs mounted for rotation about a common axis.

The driving wheel may be mounted on a drive shaft, the axis of rotation of the drive shaft being parallel to the axes of rotation of the wheel members and the bush twister. Alternatively the axis of rotation of the drive shaft may be transverse to the axes of rotation of the wheel members and the bush twister.

The wheel members may be rotatably mounted on a common arm which is mounted so as to be pivotable about a fixed axis parallel to the axes of rotation of the wheel members and the bush twister, and which is resiliently urged in a direction towards the driving wheel.

The driving wheel may have the form of a disc mounted on the drive shaft and lying in a plane normal to the axis of the drive shaft. In this case the axis of rotation of the drive shaft will be parallel to the axes of rotation of the wheel members and the bush twister. The driving wheel may have around its periphery a tyre of a material which is durable and has good frictional properties. A suitable material for such a tyre is polyurethane. Alternatively the driving wheel may have the form of a cup-like rotor with an axially directed rim carrying a tyre of a material which is durable and has good frictional qualities such as polyurethane. In this case the axis of rotation of the drive shaft will be transverse to the axes of rotation of the wheel members and the bush twister. Each disc of the wheel members may also have such a tyre around its periphery. Alternatively the bush twister may have such a tyre around its cylindrical outer surface where it is contacted by the driving wheel and the discs.

The drive shaft may have a pulley mounted thereon and around which the yarn being false twisted can be passed to thereby feed the yarn through the spindle.

The bush twister may be located axially by magnetic means situated adjacent the bush twister in its normal running position and arranged to resist any tendency for the bush twister to move in an axial direction.

The invention will now be described with reference to the accompanying drawings in which.

Figure 1:
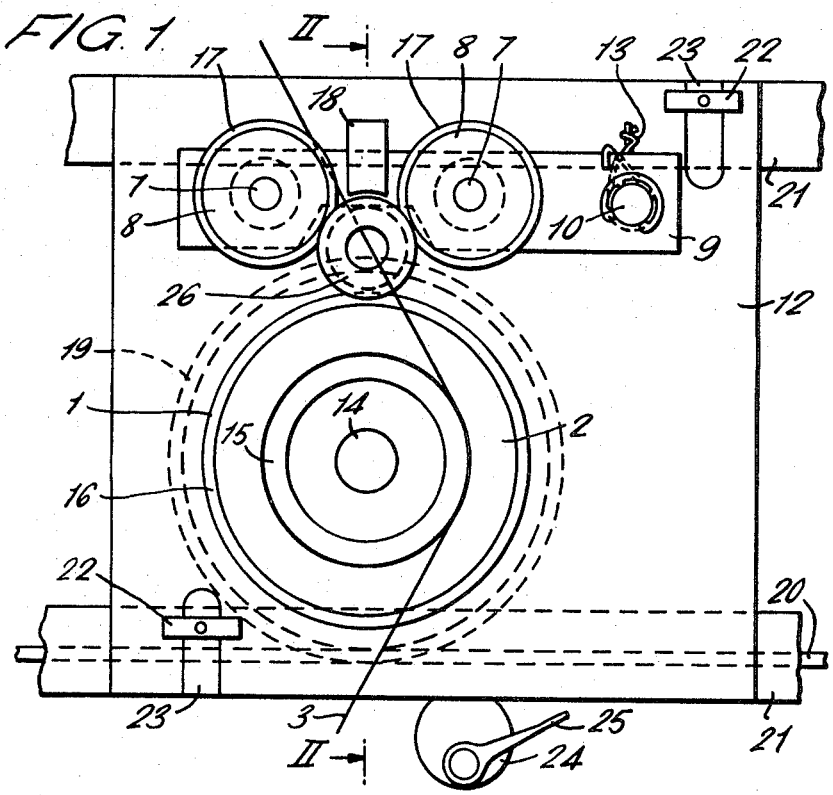
FIG. 1 shows one embodiment of false twisting apparatus according to the invention.
Figure 2:
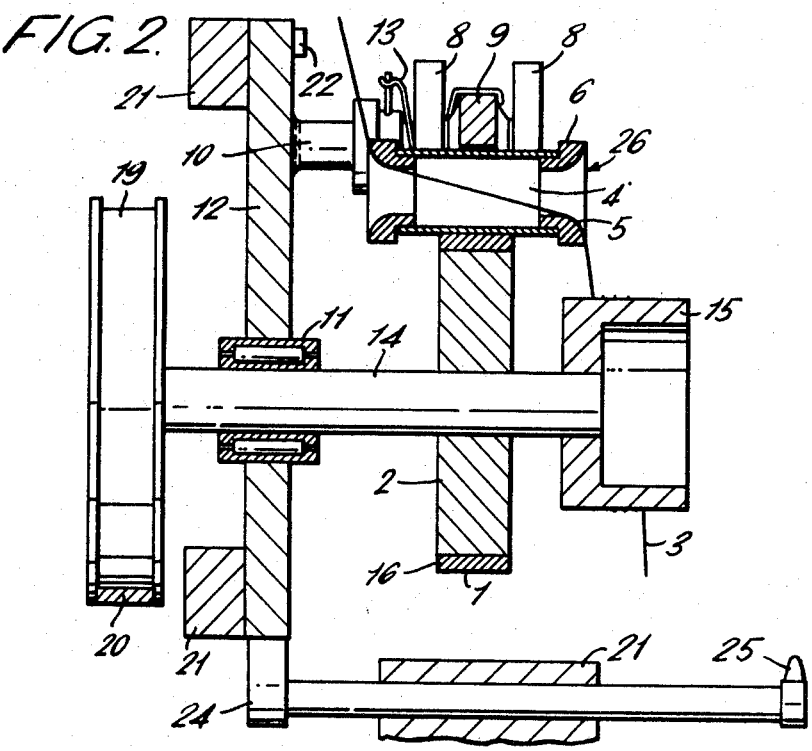
FIG. 2 shows a sectional view along the line II — II of the apparatus of FIG. 1.

FIGS. 1 and 2 show a bush twister 26 being driven in rotation by means of a driving wheel 2. The yarn 3 passes through the bore 4 of the bush twister 26 and is flase twisted by frictional engagement with the convex surfaces 5 of friction bushes 6 mounted in the ends of the bore 4. The bush twister 26 is held in frictional driving contact with the peripheral surface 1 of the driving wheel 2 by means of a pair of wheel members 8.

Each wheel member 8 comprises two discs mounted coaxially on a spindle 7 which passes through an arm 9 so that each wheel member 8 is freely rotatable. The arm 9 is pivoted about the fixed axis of shaft 10 so that it is movable in a plane containing the driving wheel 2 and is resiliently urged towards the driving wheel 2 by means of a coil spring 13.

The driving wheel 2 is mounted on a drive shaft 14 having mounted at one end a pulley 15 around which the yarn 3 is passed thereby being drawn through the bush twister 26 and fed to any further processing apparatus or wind-up means (not shown) as required.

The drive shaft 14 runs in a bearing 11 which is mounted on a support plate 12 on which the shaft 10 is also mounted. A driving pulley 19 is mounted on drive shaft 14 at the opposite end to pulley 15 and is driven by contact with an endless belt 20, the plane of travel of which is horizontal. Support plate 12 is secured to the frame 21 of a textile machine by means of slides 22 which can move in slots 23 in the plate 12, the slides 22 being secured to the frame 21 of the machine. Cam 24 which may be turned by lever 25 bears against the support plate 12 and thereby lifts the complete apparatus relative to the frame 21 of the machine. This enables the driving pulley 19 to be moved into or out of driving engagement with the endless belt 20 as required.

FIGS. 1 and 2 show an embodiment of the apparatus according to the invention in which the driving wheel 2 and the wheel members 8 have peripheral tyres 16 and 17 respectively of a material which is durable and has good frictional properties. A suitable material for such a tyre is polyurethane. Alternatively the bush tube 26 may have such a tyre around its cylindrical outer surface.

A horseshoe magnet 18 is situated adjacent the metal bush twister 26 in its normal running position to resist any tendency for the bush twister to move axially. Axial movement of the bush twister could bring the flange of one of the friction bushes 6 into contact with at least one of the wheel members 8 and there would then be undesirable frictional contact between surfaces which are moving at different linear speeds. The magnet 18 is not shown in FIG. 2 for purposes of clarity.

Figure 4:
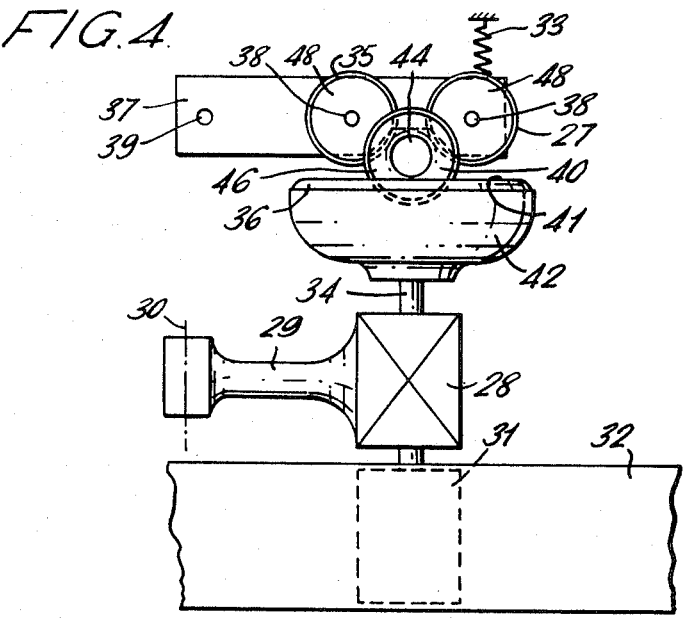
FIG. 4 shows an alternative embodiment of false twisting apparatus according to the invention.
Figure 3:
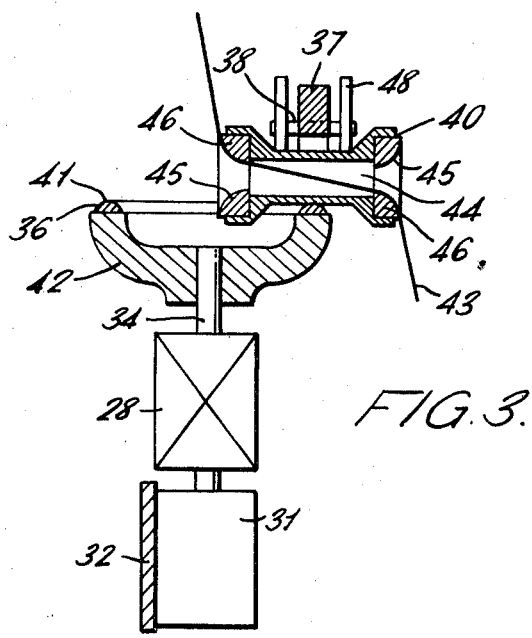
FIG. 3 is a sectional view along the line III—III of the apparatus of FIG. 4.

FIGS. 3 and 4 show a bush twister 40 being driven in rotation by means of a driving wheel 42. Yarn 43 passes through the bore 44 of the bush twister 40 and is false twisted by frictional engagement with the convex surfaces 45 of friction bushes 46 mounted in the ends of the bore 44. The bush twister 40 is held in frictional driving contact with the peripheral surface 41 of the driving wheel 42 by means of a pair of wheel members 48.

Each wheel member 48 comprises two discs mounted coaxially on a spindle 38 which passes through an arm 37 so that each wheel member 48 is freely rotatable. The arm 37 is pivoted about a fixed axis 39 parallel to the axes of rotation of the wheel members 48 and the bush twister 40, and is resiliently urged towards the driving wheel 42 by means of a spring 33.

The driving wheel 42 has the form of a cup-like rotor with an axially-directed rim and is mounted on a drive shaft 34. In the embodiment shown in FIGS. 3 and 4 the driving wheel 42 and the wheel members 48 have peripheral tyres 36 and 35 respectively of a material which is durable and has good frictional properties, the tyre 36 preferably being of crowned or domed cross-sectional shape. A suitable material for the tyres is polyurethane. Alternatively the bush twister 40 may have such a tyre around its cylindrical outer surface.

The cup-like driving wheel 42 is shown as rotating about a vertical axis on the shaft 34 which is mounted in a bearing 28. The bearing 28 is itself carried by an arm 29 pivotally mounted for rotation about an axis 30 to enable a driving wharve 31 on the shaft 34 to be brought into and out of contact with an endless driving belt 32 the plane of travel of which is vertical.

In the embodiment shown in FIGS. 3 and 4 the bush twister 40 rotates about a horizontal axis, and the yarn 43 before and after passing through the bush twister is shown to be at a small angle to the vertical. However by tilting by a small amount the axis 39, about which the arm 37 pivots, it can be arranged that the bush twister 40 rotates about an axis inclined to the horizontal by a small angle, so that the yarn path before and after the bush twister can then be vertical.

In the embodiment shown in FIGS. 3 and 4 the axes of rotation of the bush twister 40 and the wheel members 48 are horizontal, but they may be inclined at a small angle to the horizontal as above mentioned, whereas the axis of rotation of the cup-like driving wheel is vertical and therefore transverse to the axes of the bush twister and the wheel members. It will be appreciated, however, that the axis of rotation of the driving wheel need not be vertical, and that in some applications it may be desirable for the driving wheel axis to be inclined to the vertical while still being transverse to the substantially horizontal axes of the bush twister and the wheel members.

In the embodiment shown in FIGS. 1 and 2 the driving wheel rotates about a horizontal axis, and as previously stated its shaft is rotated by means of a belt of which the plane of travel is horizontal. The embodiment of FIGS. 3 and 4 can however be readily fitted to existing textile false twist crimping machines, designed to have false twisting spindles driven from belts of which the plane of travel is vertical.

The driving wheel 42 could drive more than one bush twister 40, for example two bush twisters could be driven by the driving wheel.

Prior art bearing-mounted bush twisters have been very limited as to rotational speed and therefore yarn processing speed, and also as to durability. With a driving and supporting arrangement for a bush twister according to the present invention considerably higher rotational speeds can be attained. The useful life is also considerably increased.

We claim:

1. In an apparatus for false-twisting of yarn and the like, in combination, rotatable drive wheel means having a periphery; bush-twister means for false-twisting a yarn travelling through said bush-twister means; mounting means mounting said bush-twister means with freedom of rotation; and holding means for holding said bush-twister means in frictional driving engagement with said periphery of said drive wheel means, whereby said bush-twister means is rotated in response to rotation of said drive wheel means.

2. In an apparatus as defined in claim 1, said holding means comprising at least a pair of wheel members freely rotatable about respective parallel axes.

3. In an apparatus as defined in claim 2, wherein each of said wheel members comprises at least two discs mounted for rotation about a common axis.

4. In an apparatus as defined in claim 2, said mounting means comprising a mounting arm mounting said wheel members thereon.

5. In an apparatus as defined in claim 4; and further comprising pivot means mounting said arm for pivotal movement about a fixed axis paralleling said respective parallel axes and the axis of rotation of said bush-twister means.

6. In an apparatus as defined in claim 5; and further comprising biasing means resiliently biasing said arm about said fixed axis in direction towards said axis of rotation of said bush-twister means.

7. In an apparatus as defined in claim 3, each of said discs having a periphery; and further comprising an annulus of wear-resistant friction-promoting material encircling the peripheries of the respective discs.

8. In an apparatus as defined in claim 1, said holding means comprising wheel means, and said wheel means and bush-twister means each also having respective peripheries; and further comprising annular means of wear-resistant friction-promoting material encircling at least one of said peripheries.

9. In an apparatus as defined in claim 8, wherein said material is polyurethane.

10. In an apparatus as defined in claim 8, wherein said annular means is provided on and encircles at least an additional one of said peripheries.

11. In an apparatus as defined in claim 8, wherein said annular means is provided on and encircles all of said peripheries.

12. In an apparatus as defined in claim 2; further comprising a rotary shaft mounting said drive wheel means and being rotatable about an axis paralleling said respective parallel axes and the axis of rotation of said bush-twister means.

13. In an apparatus as defined in claim 12, said drive wheel means comprising a disc-shaped drive wheel whose general plane extends normal to the axis of rotation of said rotary shaft.

14. In an apparatus as defined in claim 2; further comprising a rotary shaft mounting said drive wheel means and being rotatable about an axis extending transversely to said respective parallel axes and the axis of rotation of said bush-twister means.

15. In an apparatus as defined in claim 14, said drive wheel means comprising a cupped rotor having an axially directed rim which constitutes said periphery.

16. In an apparatus as defined in claim 1; further comprising magnet means acting upon said bush twister means for preventing displacement thereof in direction of the axis of rotation of said bush-twister means.

17. In an apparatus as defined in claim 1; further comprising a rotatable drive shaft mounting said drive wheel means for rotation; and a pulley mounted on said drive shaft and having a circumferential surface adapted to have yarn being false-twisted convoluted thereabout so as to effect advancement of the yarn through said bush-twister means.

* * * * *